N. L. JONES.
TIRE HEATING FORGE.
APPLICATION FILED APR. 28, 1913.
1,067,817.
Patented July 22, 1913.
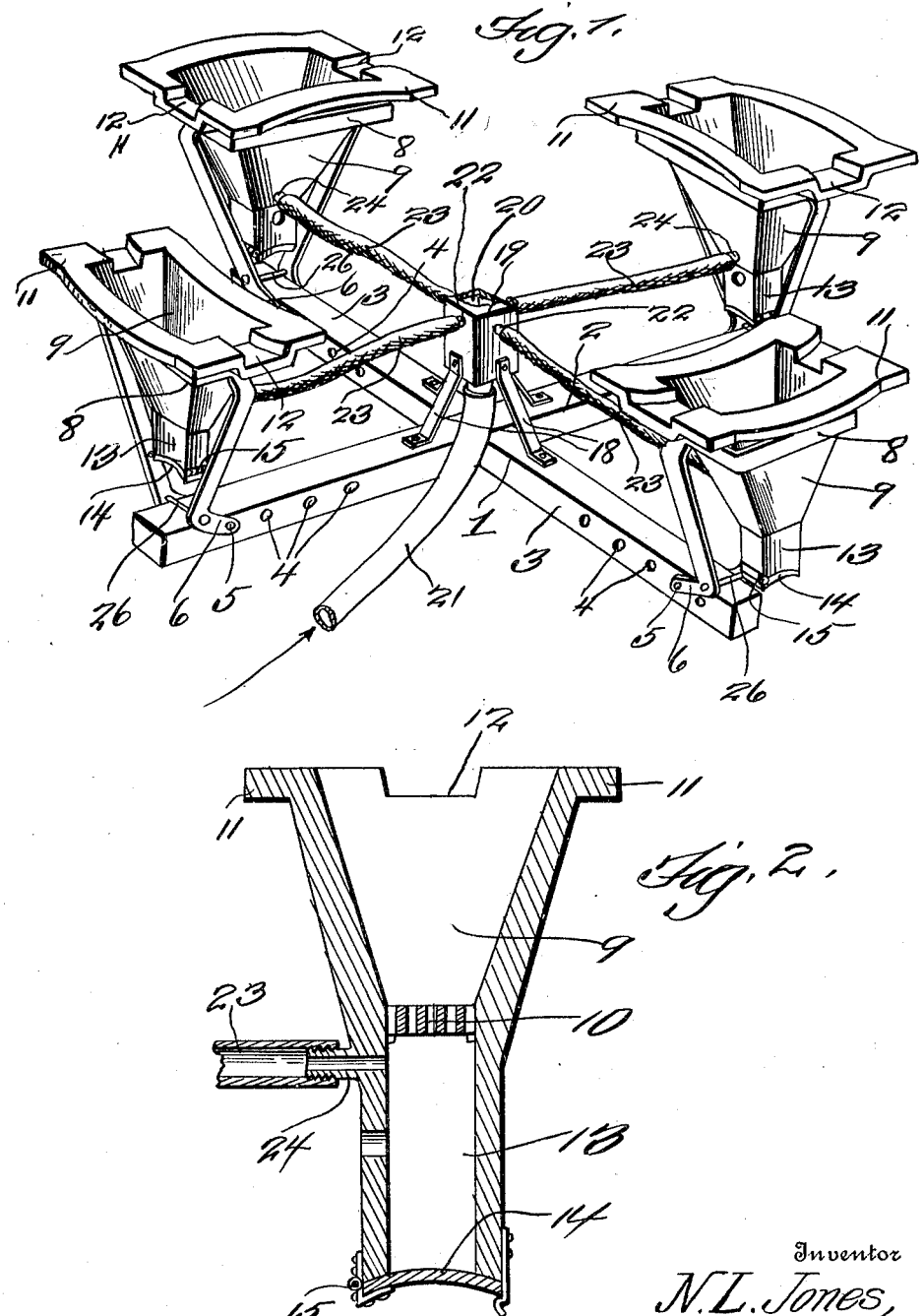

UNITED STATES PATENT OFFICE.

NORWOOD L. JONES, OF TEMPERANCEVILLE, VIRGINIA.

TIRE-HEATING FORGE.

1,067,817.  Specification of Letters Patent.  Patented July 22, 1913.

Application filed April 28, 1913. Serial No. 763,995.

*To all whom it may concern:*

Be it known that I, NORWOOD L. JONES, a citizen of the United States, residing at Temperanceville, in the county of Accomac and State of Virginia, have invented a new and useful Tire-Heating Forge; and I do hereby declare the following to be a full, clear, and exact description of the invention, such as will enable others skilled in the art to which it appertains to make and use the same.

This invention relates to a new and useful forge for heating wheel tires.

An object of the invention is the provision of a device of this nature comprising a plurality of detachably supported fire pots or miniature furnaces, so arranged as to receive a tire, whereby the same may be properly heated, so as to facilitate the banding of a wheel.

A feature of the invention is the provision of a blacksmith's blower or bellows to be used in conjunction with the device, so as to supply equal air drafts to each fire pot.

In practical fields the details of construction may necessitate alterations, to which the patentee is entitled, provided the alterations fall within the scope of what is clamed.

The invention comprises further features and combination of parts, as hereinafter set forth, shown in the drawings and claimed.

In the drawings:—Figure 1 is a view in perspective of the improved forge for heating tires. Fig. 2 is an enlarged detail sectional view through one of the fire pots.

Referring more particularly to the drawings, 1 designates a base frame comprising intersecting bars 2 and 3, extending at right angles to one another. These bars are provided with a plurality of apertures 4. Extending through any one of the apertures of each bar at each end is a bolt 5, on which the lateral extending ends 6 of the vertical yoke are pivotally mounted. Each yoke at its upper portion is provided with a rectangular frame 8, forming means for the reception of the tapering contour of the casing of a fire pot 9. It will be observed that the interior of each fire pot or furnace tapers downwardly toward the grate 10, while the upper portion of the casing of each fire pot is provided with an outwardly extending flange 11. Also the upper portion of each fire pot at each end thereof is provided with recesses, the contours of which correspond to the curvature of a wheel tire or band. These recesses 12 are annularly alined. Extending from the tapering portion of each fire pot is an extension 13, the lower end of which is provided with a slide or closure 14 hinged at 15, and adapted to be held in a closed position by the catch. This closure or slide may be swung open when desired, so as to remove the refuse and the like.

Supported by the brace brackets 18 at the intersection of the bars 1 and 2 is a casing 19 having a chamber 20, into which air chamber 20 air may be supplied by any suitable blacksmith's blower or bellows (not shown) adapted to be connected to the pipe 21, which pipe or tube 21 connects to an extension of the casing 19. The casing 19 is provided with a plurality of tubular extensions 22, to which the tubes 23 are connected. The outer ends of the tubes are suitably connected to the tubular extension 24 of the lower portion of said fire pot. As will be observed when air is forced through the tube or pipe 21, an equal amount of air is supplied to each fire pot beneath the fire, and owing to the fire being located beneath the tire or band, the tire or band may be heated as desired, in order to facilitate the banding of a wheel. By means of the bolts 5 the yokes may be adjusted toward the intersection of said bars 1 and 2, while the bolts 26 (which pass through the sides of the yokes) resting upon the bars 1 and 2, support the yokes in vertical positions. However, each yoke may be tilted slightly toward the intersection of the bars 1 and 2.

From the foregoing it is apparent that there has been devised a simple and efficient forge for heating wheel tires or bands, and one which has been found desirable and practical.

The invention having been set forth, what is claimed as new and useful is:—

1. In combination, a base frame comprising intersecting members, a plurality of fire pots, yokes adjustably connected to said members for detachably supporting said fire pots, and means whereby an equal amount of air may be supplied to each fire pot.

2. In combination, a base frame comprising intersecting members, yokes pivotally and adjustably connected to said members, means for supporting the yokes in vertical positions, fire pots removably supported in said yokes, and means whereby an equal amount of air blast may be supplied to each fire pot.

3. In combination, a base frame comprising intersecting members, yokes pivotally and adjustably connected to said members, means for supporting the yokes in vertical positions, fire pots removably supported in said yokes, a casing supported upon the base frame having an air chamber, a tube connecting the casing to each fire pot, and an air supply tube connected to the casing whereby an equal amount of air may be supplied to each fire pot.

4. In combination, a base frame comprising intersecting members, yokes pivotally and adjustably connected to said members and terminating at their upper portions in rectangular frames, means for supporting the yokes in vertical positions, fire pots removably supported in the frames of said yokes, a casing supported upon the base frame having an air chamber, a tube connecting the casing to each fire pot, and an air supply tube connected to the casing whereby an equal amount of air may be supplied to each fire pot.

In testimony whereof I have signed my name to this specification in the presence of two subscribing witnesses.

NORWOOD L. JONES.

Witnesses:
 THOS. E. JOHNSON,
 ELMER C. MATTHEWS.

---

Copies of this patent may be obtained for five cents each, by addressing the "Commissioner of Patents, Washington, D. C."